United States Patent [19]

Bryant

[11] 4,111,042

[45] Sep. 5, 1978

[54] COMBINED PRESSURE AND TEMPERATURE CORRECTION APPARATUS FOR GAS METERS

[75] Inventor: Lorton W. Bryant, Greenwood, Ind.

[73] Assignee: Dresser Industries, Inc., Dallas, Tex.

[21] Appl. No.: 835,568

[22] Filed: Sep. 22, 1977

Related U.S. Application Data

[63] Continuation-in-part of Ser. No. 584,318, Jun. 6, 1975, abandoned.

[51] Int. Cl.² .......................... G01F 3/02; G01F 15/02
[52] U.S. Cl. .................................................. 73/194 M
[58] Field of Search ................. 73/194 M, 231 M, 233

[56] References Cited

U.S. PATENT DOCUMENTS

| | | | |
|---|---|---|---|
| 2,059,547 | 11/1936 | Brandl | 73/233 |
| 2,222,551 | 11/1940 | Ziebolz et al. | 73/233 X |
| 2,438,935 | 4/1948 | Marsh | 73/233 |
| 2,601,777 | 7/1952 | Woodward | 73/30 |
| 3,073,157 | 1/1963 | Gehre | 73/233 X |
| 3,169,399 | 2/1965 | Allport et al. | 73/233 |
| 3,581,566 | 6/1971 | Randall | 73/233 |

Primary Examiner—Richard C. Queisser
Assistant Examiner—John P. Beauchamp
Attorney, Agent, or Firm—Daniel Rubin

[57] ABSTRACT

A self-contained unit integrally operable in conjunction with a gas meter registers equivalent standard gas volume by correcting actual gas volume for both pressure and temperature. A magnetic couple provides a drive input to the correction unit at a rate proportional to the operational rate of the meter. Separate temperature and pressure sensitive mechanisms exposed to the gas flow each provide a linear displacement proportional to changes in their absolute condition. Respective displacement of each is supplied independently to a dual input single output multiplying mechanism from which an integrated output serves to position a limiting cam in angular correlation therewith. Position of the cam effectively modifies the drive input from the magnetic couple through a crank arrangement that drives the corrected register at a rate correlated to the integrated function of absolute pressure and temperature of the metered gas.

20 Claims, 13 Drawing Figures

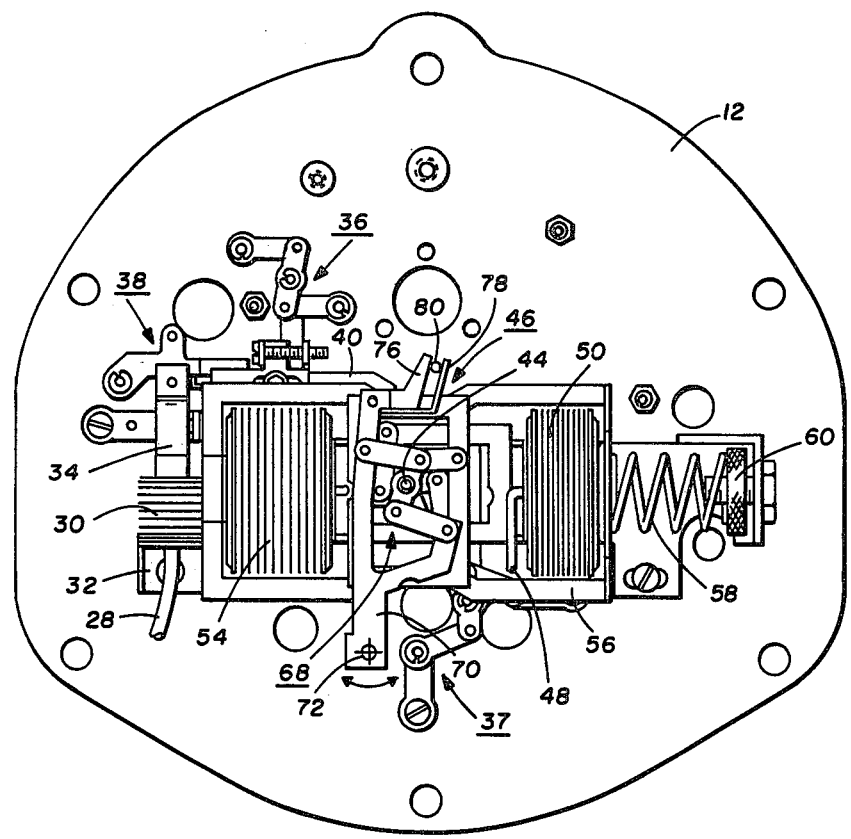
FIG. 4
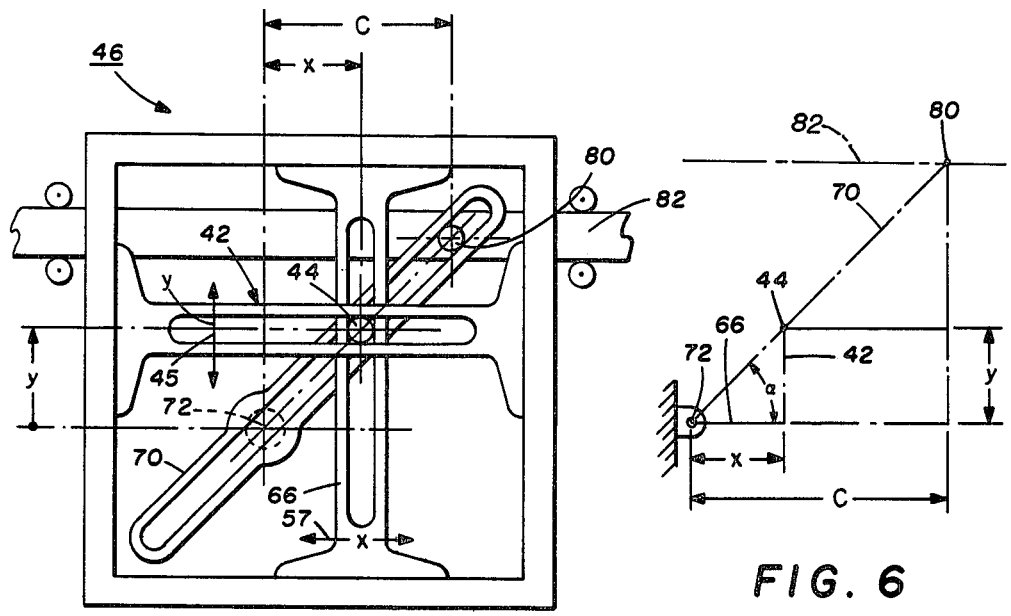
FIG. 5
FIG. 6

COMBINED PRESSURE AND TEMPERATURE CORRECTION APPARATUS FOR GAS METERS

This application is a continuation-in-part of application Ser. No. 584,318 filed June 6, 1975, now abandoned.

BACKGROUND OF THE INVENTION

1. The field of art to which the invention pertains comprises the art of measuring and testing.

2. By and large, the usual type of gas meter registers the actual volume of gas passed therethrough. Even where density changes of the gas are incurred in transmission from varying pressure and/or temperature conditions to which it is exposed, these changes are largely ignored. Yet gas being a compressible medium, the quantity by weight passing through a meter is a function not only of its volume but also its pressure and temperature in accordance with Boyle's and Charles' laws. Failure to correct for these deviations can therefore introduce substantial error in the readout value of the commodity being sold. In the instance of a combustible gas being supplied as a fuel, it should be recognized that the saleable commodity thereof is in its calorific content per unit of weight rather than volume.

Where cost charges are predicated on volume alone, a density increase will ordinarily cause the supplier to incur an economic loss whereas a density decrease will ordinarily cause the recipient to incur an economic loss. As can be appreciated, neither situation is equitable in terms of the real commodity being marketed. In recognition of the foregoing and with the objective of obtaining a more correct and equitable charge basis to both the supplier and recipient of the metered gas, various efforts have been made over the years to correct from the actual volume to an equivalent standard volume. Combined pressure and temperature correction apparatus has been in the form of independent instruments adapted to mount standing alone externally to the gas meter which provides a standard instrument drive interface. Exemplifying prior art gas meter compensating apparatus for pressure are the disclosures of U.S. Pat. Nos. 2,093,151 and 2,122,529 whereas exemplifying apparatus for correcting temperature is disclosed by U.S. Pat. Nos. 2,791,118 and 3,581,566. A density measuring device integrating both temperature and pressure variables is disclosed in U.S. Pat. No. 2,601,777.

SUMMARY OF THE INVENTION

The invention relates to gas meters and particularly to compensating apparatus useable in conjunction therewith for effecting a standard volume register of gas without regard to density changes imposed by pressure and/or temperature in the course of transmission. More specifically, the invention relates to a small compact correction apparatus for gas meters that is assembled as an integral part of the gas meter without external connections for temperature and pressure sensors in the manner of the prior art.

This is achieved in accordance herewith in the form of a self-contained pressure-temperature correction unit integrally operable in conjunction with the gas meter. Separate sensors for both pressure and temperature each produce a motion displacement proportional to the respective absolute condition thereof. A multiplying mechanism receives the separate displacement inputs and via a single integrated output positions a cam in angular correlation therewith. Drive input from the meter effectively modified by the cam position limits the angular stroke of a one-way clutch driving a corrected meter register. By compensating in this manner the corrected register accurately reflects an equivalent standard volume of gas as an integrated function of both pressure and temperature. The specific construction by which this is obtained affords high accuracy with low cost virtually frictionless operation yet provides high linearity within the operating ranges. Hysteresis is substantially absent as is slack in the movement throughout a relatively narrow range of motion in which the unit operates. By virtue of the simplicity and accuracy afforded by the combined compensation hereof, a solution to a long standing problem is provided respecting such meters.

Notwithstanding, where meter applications in which either pressure or temperature are relatively constant or at most subject to minimal variation requiring virtually insignificant amounts of compensation, its variable mechanism can be readily replaced by a presettable constant input therefor. Such applications might occur by way of example where the meter input is constantly subject to preregulated pressure control. Similarly, where ground conditions containing the gas conduit are subject to minimal temperature swings, as occur for example in southern regions of the U.S., the need for temperature compensation may be so marginal as to be considered impractical to provide.

It is therefore an object of the invention to provide novel apparatus for obtaining gas meter readout corrected to an equivalent standard pressure and temperature.

It is a further object of the invention to provide apparatus able to effect the previous object by correcting for both pressure and temperature in a self-contained unit integrally operable with the gas meter.

It is a further object of the invention to easily and simply modify the apparatus of the foregoing objects by replacing either of the variable temperature or pressure inputs with a presettable constant input therefor.

It is still further object of the invention to effect the aforementioned objects with a relatively small, compact apparatus affording high accuracy at comparably low cost of construction enabling the correction apparatus with meter to be economically competitive with such other gas meters lacking similar correction.

BRIEF DESCRIPTION OF THE DRAWINGS

FIG. 4 is a plan view of the pressure sensing unit with computing linkage;

FIGS. 5 and 6 are schematic and graphical representations, respectively, of the computing linkage;

Referring now to FIGS. 1–9 of the drawings, there is shown the pressure-temperature compensating unit in accordance herewith designated 10 adapted for mounting via a plate 12 onto a gas meter not shown. Included with the unit in preferred form is a counter 14 having an actual volume readout register 16 and a compensated readout register 18 corrected for temperature and pressure by unit 10. Input to unit 10 is by means of a shaft 20 magnetically coupled to the meter drive via magnet 22 effectively isolating the operating portion of unit 10 from pressurized sections of the meter. Being directly coupled to the meter, shaft 20 operates proportional to the amount of gas being passed as does shaft 24 driven through a gear train not shown. A shaft 25 provides the input drive to register 18 through intermediate linkage to be described.

Figure 1:
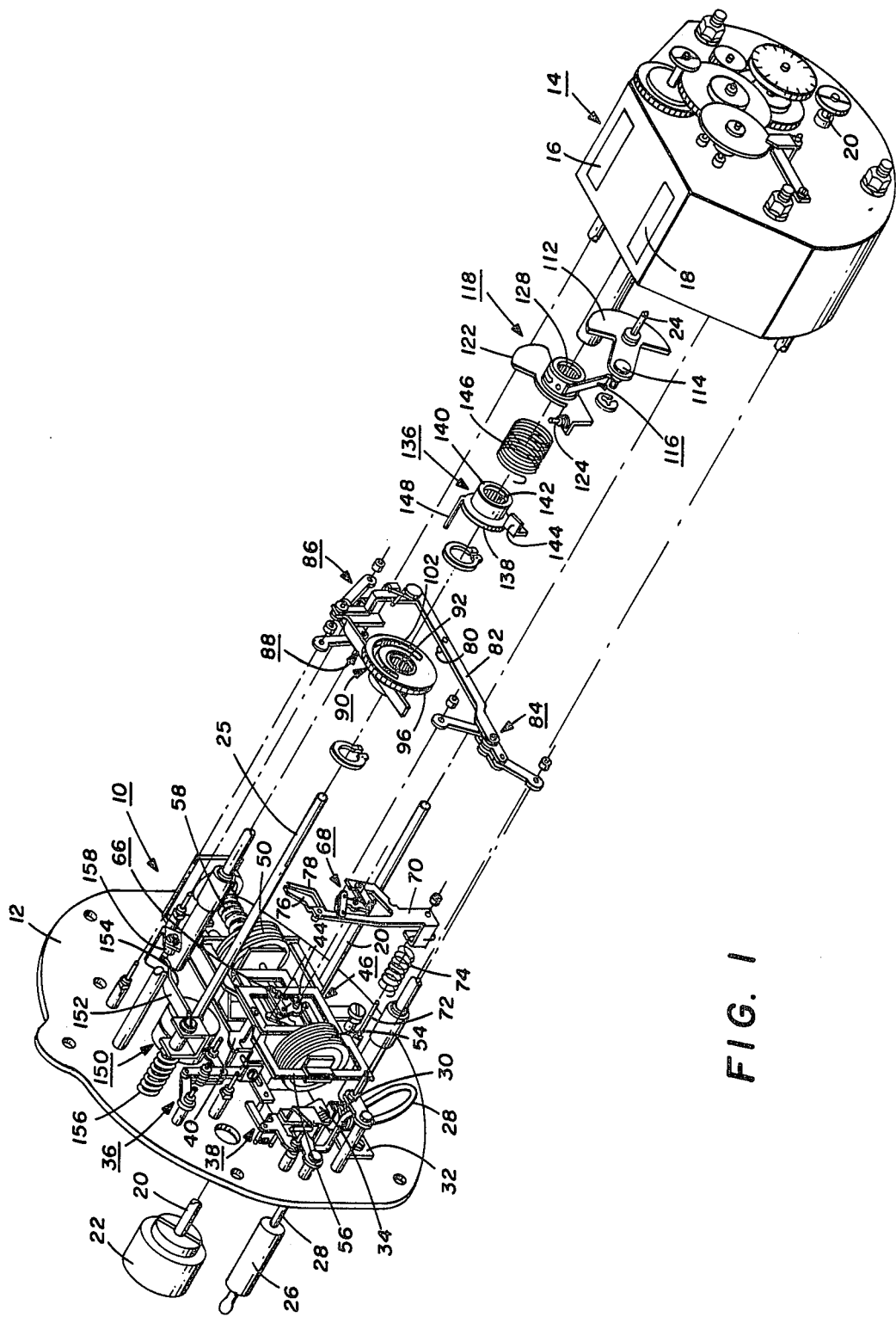
FIG. 1 is an isometric exploded view of the pressure-temperature compensating unit hereof.
Figure 2:
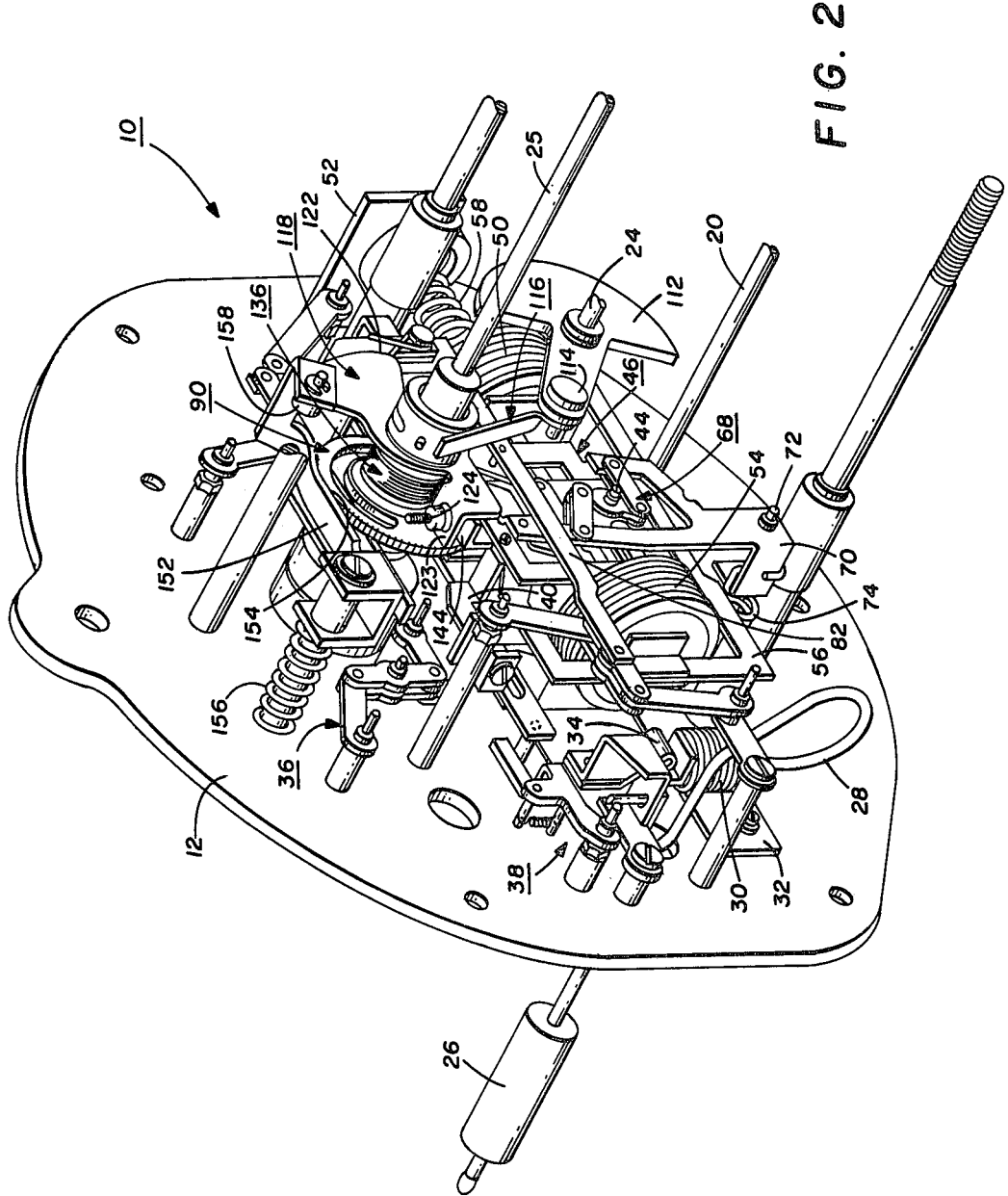
FIG. 2 is an isometric assembled view of the pressure-temperature compensating unit hereof.
Figure 3:
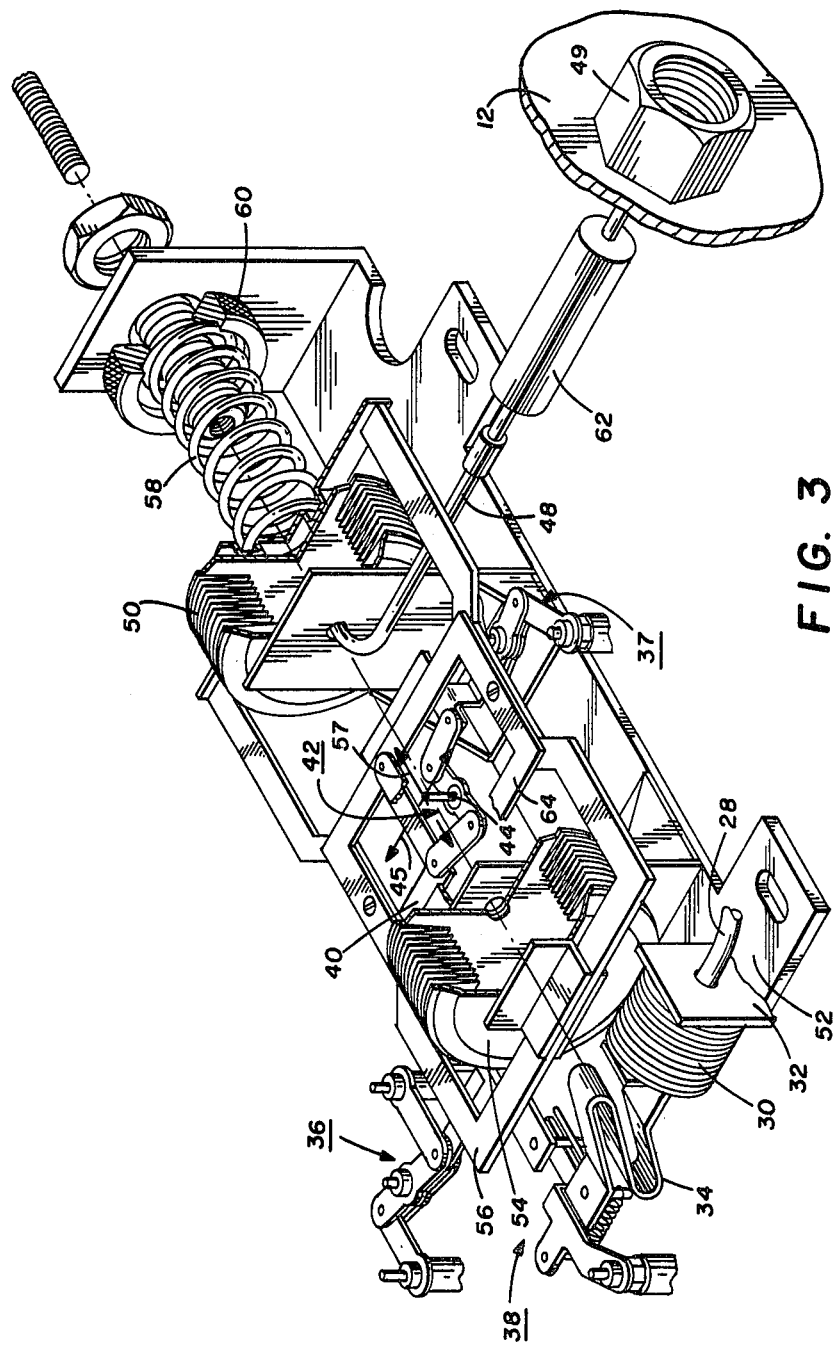
FIG. 3 is an isometric view of the pressure sensing unit.
Figure 7:
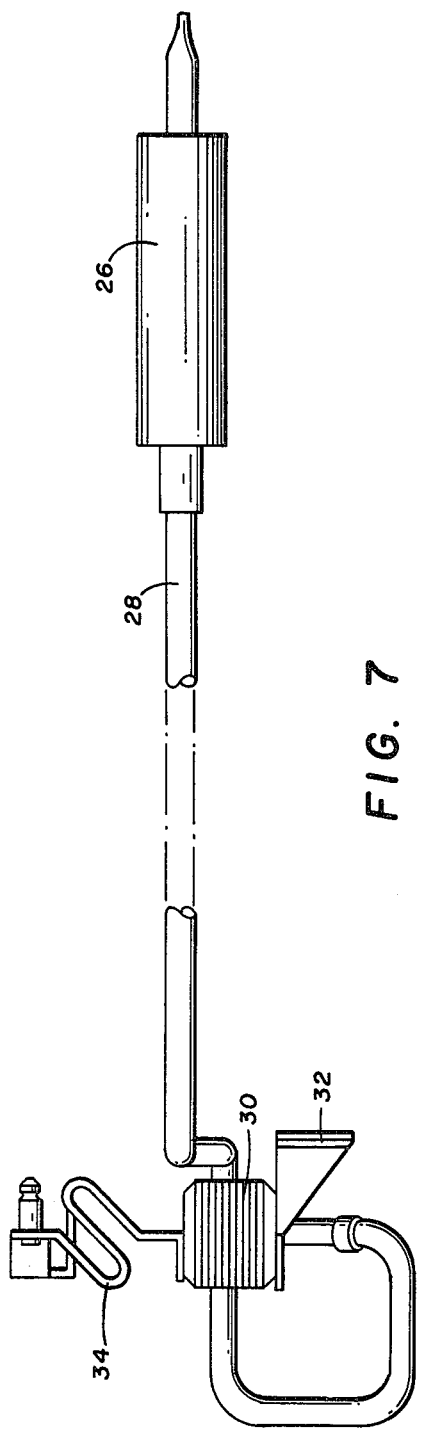
FIG. 7 is an assembly view of the temperature sensing unit.

For temperature sensitivity in effecting correction of register 18, there is provided, as best illustrated in FIGS. 1, 2 and 7, a liquid filled bulb 26 extending beyond plate 12 into a suitable sealed well exposed to the metered gas stream and connected by means of a capillary 28 to a liquid filled bellows 30. The bellows is supported on a bracket 32 and may include a solid filler for reducing its internal volume in order to minimize ambient effects thereon. Supported secured to the free end of bellows 30 for transmitting its movement is an S-shaped terminal 34 which preferably is of bimetallic composition to simultaneously compensate bellows movement for the effects of ambient temperature changes. Terminal 34 in turn is connected at its other end via a plurality of intervening links 38 to Watts linkages 36, 37 and 42 (FIG. 3) for effecting straight line vertical motion of pin 44 as represented by arrow 45. Pin 44, centrally located in Watts linkage 42, comprises a dual input source for a single output similar triangle multiplier 46 to be described.

Pressure sensitivity is derived through an open ended tube 48 (FIG. 3) exposed to the flowing gas pressure by connection through a coupling nut 49 to a pressure tap in the meter body cover 12. Pressure received by tube 48 is communicated internally to a sealed bellows 50 mounted on a common base 52 and having an identical mean effective area as aneroid bellows 54. With the latter being evacuated and sealed from atmosphere, an identical and opposing response is rendered in both bellows to encountered changes in ambient barometric pressure. Securing each of the bellows together is an operating pressure link 56 which is caused to incur a horizontal displacement or position change as shown by arrow 57 in proportional response to pressure changes reflected by expansion and contraction of bellows 50. Opposing movement of linkage 56 for calibrating and linearizing the output motion thereof is a coiled spring 58 preloaded in compression by means of an adjustment screw 60. With this arrangement, the position of pressure link 56 is positionably maintained in direct correlation to the absolute pressure of the metered gas. A valve 62 situated in the inlet path of tube 48 operates to prevent inadvertent overpressure to bellows 50 beyond rated capacity of the bellows.

Displacement of link 56 in a manner analagous to the temperature linkage described supra is transmitted horizontally linear (as illustrated) via a frame 64. The frame supports a Watts linkage 66 connected to multiplier pin 44 commonly shared with the temperature input from temperature bellows 30. Likewise sharing pin 44 through a Watts linkage 68 is an output arm 70 pivotally supported on post 72. A torsion spring 74 coiled about post 72 and secured to arm 70 acts to bias arm 70 with a small preload to remove any residual slack in the bearing supports. Shifting of pin 44 from the dual inputs thereto causes arm 70 to pivot about post axis 72 in the course of which an arm extension 76 cooperating with a retainer spring 78 to grip a pin 80 on a sliding link 82 causes a lateral shifting of the latter. Sliding link 82 is supported at opposite ends between Watts linkage 84 and 86 in order to ensure linear movement thereof and by means of a connecting rod 88 is secured to a rotatable cam 90. Total displacement of pin 44 in accordance herewith is on the order of slightly greater than ⅛ inches for temperature and ⅜ inches for pressure.

An understanding of the integrated output afforded by multiplier 46 from the dual input of both pressure and temperature to multiplier pin 44 will now be briefly provided with specific reference to FIGS. 5 and 6. The multiplier operates on the classical principle of similar triangles for obtaining an output corresponding to exact multiplication of two input motions provided thereto. Further describing the principles thereof is by way of example R. T. Hinkle's *Kinematics of Machines*, second edition, Prentice-Hall, Inc. The two inputs to pin 44 are represented by temperature Watts linkage 42 linearly movable in the Y plane and pressure Watts linkage 66 linearly movable in the X plane. Each of the separate inputs effect a corresponding displacement of pin 44 in the respective directions thereof causing output arm 70 to pivot about fixed axis 72 through an angle $\alpha$. Hence, pin 44 is free to travel simultaneously in two different directions within design limits rendering its Y position directly proportional to absolute temperature of the meter fluid and its X position directly proportional to absolute pressure of the meter fluid. In the process of integrating these two inputs into pivot angle $\alpha$ of arm 70, pin 80 slideably displaces link 82 in direct proportion thereto. Insofar as these elements operatively cooperate with each other, it is critical in construction that regardless of the position of output arm 70, pin 44, pin 80 and post 72 must all be on a common line.

Figure 9:
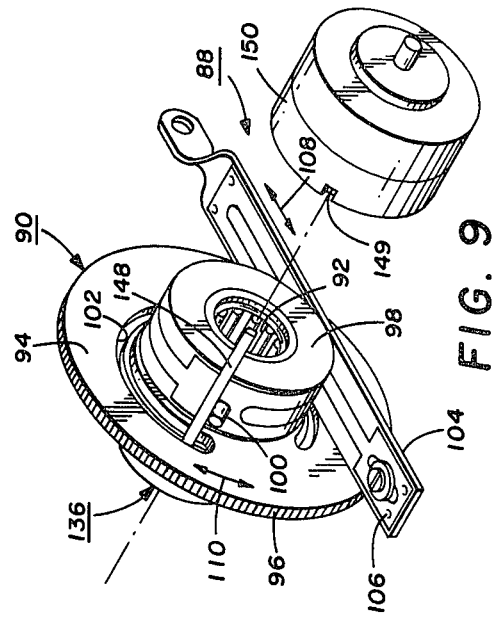
FIG. 9 is an isometric enlarged view of the adjustable cam and drive assembly.

Cam 90, as best seen in FIGS. 1 and 9, is angularly positioned by connecting rod 88 and is supported via an idler bearing 92 as to be rotatably disengaged from shaft 25 providing the input to register 18. Comprising cam 90 is a wheeled disc 94 including a peripheral braking surface 96 and integrally joined with a central hub 98. Extending radially outward from the hub is a pin 100 located juxtaposed within the extent of an arcuate disc slot 102. On the basis of input from sliding link 82, connecting rod 88 serves to rotatably displace and locate pin 100 in a controlled angular orientation and for that purpose is constructed of a relatively rigid backup plate 104 supporting a thin slotted drive band 106. The band is form fitted over pin 100 in a tight wrap-around relation to hub 98 such that movement of rod 88 as shown by arrow 108 rotatably displaces cam 90 with pin 100 as shown by arrow 110. In this fashion, the integrated output of multiplier 46 from sliding link 82 and connecting rod 88 presettably positions pin 100 about counter input shaft 25 in an angular orientation correlated to the integrated dual pressure-temperature input thereto. In a feed back arrangement to be described the position of pin 100 controls the drive of register input shaft 25.

Figure 8:
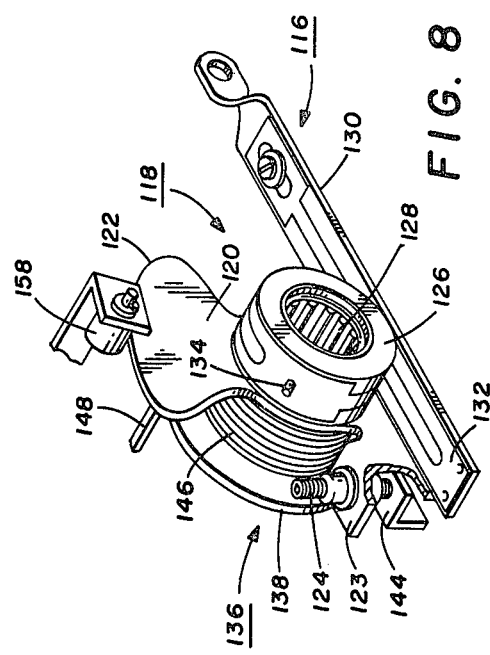
FIG. 8 is an isometric enlarged view of the oscillating drive arm.

Input shaft 20, as previously indicated, is magnetically coupled to the meter and drive shaft 24 (FIGS. 1 and 2) at a rate directly proportional to the actual gas quantity being passed by the meter. Secured on shaft 24 for rotation thereby is a fixed throw eccentric mechanism that includes a disc crank 112 connected by an offset pin 114 to a connecting rod 116 adapted to rotatably operate a driving arm 118. The latter arm includes a more or less elongated disc plate 120 (see also FIG. 8) having a cam surface 122 along one edge face and an L-shaped ledge 123 supporting an adjustable, downwardly protruding screw 124. Integrally formed with plate 120 is a hub 126 rotatably supported on counter input shaft 25 but disengaged therefrom by an idler bearing 128. A connecting rod 116, like rod 88 supra, is formed of a relatively rigid backing plate 130 to which a thin slotted steel drive band 132 is attached in wraparound relation about the hub. A radial pin 134 extending from the hub effects a driving interfit with the band.

Forward of driving arm 118 and adapted to be driven from engagement by screw 124 is a driven arm 136. The driven arm includes a disc like plate 138 connected to a central hub 140 containing an idler bearing 142 to likewise be supported rotatably free about outer input shaft 25. Extending from one end of plate 138 is a ledge 144 adapted by means of a torsion spring 146 to be rotated clockwise in an approaching engagement with the under end of driving arm screw 124. Extending axially forward at the other end of plate 138 is an elongated arm 148 extending axially through cam 90 slot 102 positioned by spring 146 in side contact against pin 100 until terminating secured at slot 149 in the end face of clutch 150 (FIG. 9). The extent of gap between ledge 144 and the under end of screw 124 at any given time is determined by the position of cam pin 100 limiting the return stroke of arm 136 by contact with arm 148. Clutch 150 directly drives counter shaft 25 and comprises a one-way clutch of a type commercially available such that it is operative to rotate the shaft in its forward stroke while adapted to slip about the shaft in its backward stroke. By changing the gear ratio between shafts 20 and 24, the cycle relationship between arm 148 and uncompensated index 16 can be suitably varied.

To prevent rotative displacement of cam 90 during the backward slip stroke of clutch 150, there is provided a braking assembly comprising a brake arm 152 having a brake surface 154 on its underside engageable against cam 90 brake surface 96 in only that portion of the cycle. A spring 156, compressed between mounting plate 12 and arm 152, biases brake arm 152 toward and against brake surface 96 whenever drive arm 148 is in side contact with pin 100. On arm 148 being displaced from pin 100 by action of screw 124 contacting ledge 144, brake surface 154 is raised and disengaged from surface 96 through action of follower 158 being engaged by driving arm 118 cam surface 122. In this manner, release of the brake is thereby completely coordinated with operation and inoperation of clutch 150. During the period of brake release cam 90 is free to be rotated from any changing output being supplied from multiplier 46.

In operation, unit 10 is mounted via a mounting plate 12 onto a gas meter with which it is to be used. Through a magnetic couple provided by magnet 22, shaft input 20 is provided to counter 14 for register 16 to indicate the actual volume of gas being passed by the meter. Rotatably operable by shaft 20 at a rate proportional thereto is a shaft 24 which through compensating mechanism 10 effects a proportionately variable drive to input shaft 25 operating corrected register 18.

Compensating mechanism 10 includes a temperature bulb 26 and a pressure connection 48 both communicating with the metered gas stream to produce displacement of Watts links 42 and 66 in response to condition changes, respectively. The output of each is linearly supplied concomitantly as an input to pin 44 of multiplier 46 affording an integrated output supplied through pin 44 and Watts link 68 to output arm 70 for displacing sliding link 82. Movement of link 82 functions to rotatably position cam pin 100 to an angular location correspondingly oriented to the integrated output of the multiplier.

Disc crank 112 operates in a fixed stroke causing its connecting rod 116 to rotatably displace driving arm 118 in an oscillating motion about shaft 25. Cranking motion of arm 118 causes the underend of pre-adjusted screw 124 to engage and disengage the topside of driver arm ledge 144. Engagement by the screw against the ledge causes arm 136 to pivot freely about shaft 25 in one direction displacing arm 148 from cam pin 100 and causing clutch 150 to drive shaft 25 for operating register 18. On the return stroke of arm 118, screw 124 and ledge 144 become disengaged permitting spring 146 to return arm 136 to its former position in which arm 148 rotatably contacts pin 100. It should be understood that the latter may have been shifted in the interim by action of multiplier 46. Consequently, the oscillating stroke of driven arm 136 is always less than that of driving arm 118 by virtue of the travel limit imposed on the former by the changing angular position of pin 100. Once contact between arm 148 and pin 100 is restored, it is maintained by spring 146 until screw 124 again engages ledge 144 to lift arm 148 therefrom. Since the rotational arc traversed by arm 136 is varied as a combined function of temperature and pressure of the metered fluid as provided by multiplier 46 to cam 90, it in turn subjects clutch 150 to a comparable travel arc during which shaft 25 drives compensator register 18.

In order to ensure against multiplier displacement of cam 90 during the operational stroke of clutch 150, brake arm 152 maintains a braking action against cam surface 96. On completion of the clutch drive, the brake is released permitting resetting of cam 90 if required to reflect interim changes in temperature and/or pressure of the metered fluid.

Figure 10:
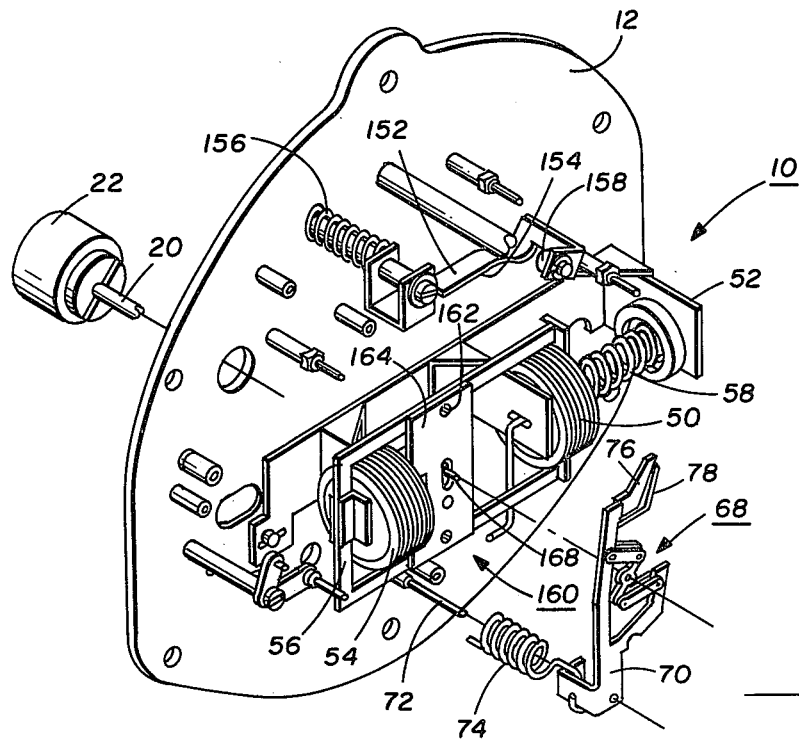
FIG. 10 is a fragmentary view similar to FIG. 1 for a unit modification thereof.

For those meter applications in which either temperature or pressure are not likely to incur significant variation for reasons explained above, the variable mechanism therefor can be readily replaced by a constant input rather than permit the variable mechanism to function per se in a constant manner. Such a modification to the basic mechanism is contemplated by the construction of FIGS. 10-13 adapted to function with a presettable constant temperature input and variable pressure input. With reference to FIG. 10, it can be understood that the temperature sensing mechanism and associated components from bulb 26 to Watts linkage 42 have been eliminated and essentially replaced by an adjustable bridge unit 160 permanently secured via screws 162 to pressure link 56.

Figure 11:
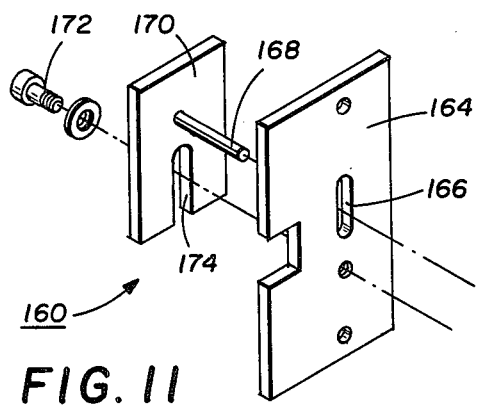
FIG. 11 is an exploded isometric view for the constant temperature input in the modification of FIG. 10.
Figure 13:
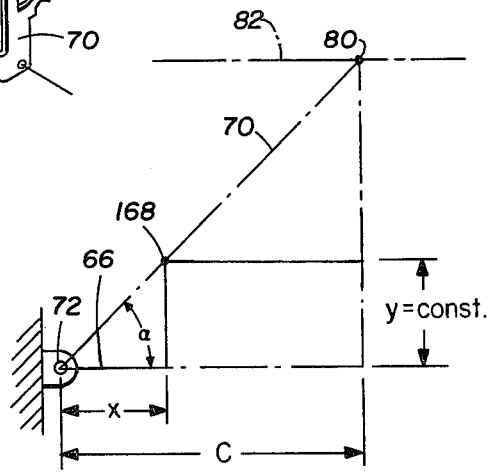
FIGS. 12 and 13 are schematic and graphical representations similar to FIGS. 5 and 6, respectively, for the modification of FIG. 10.
Figure 12:
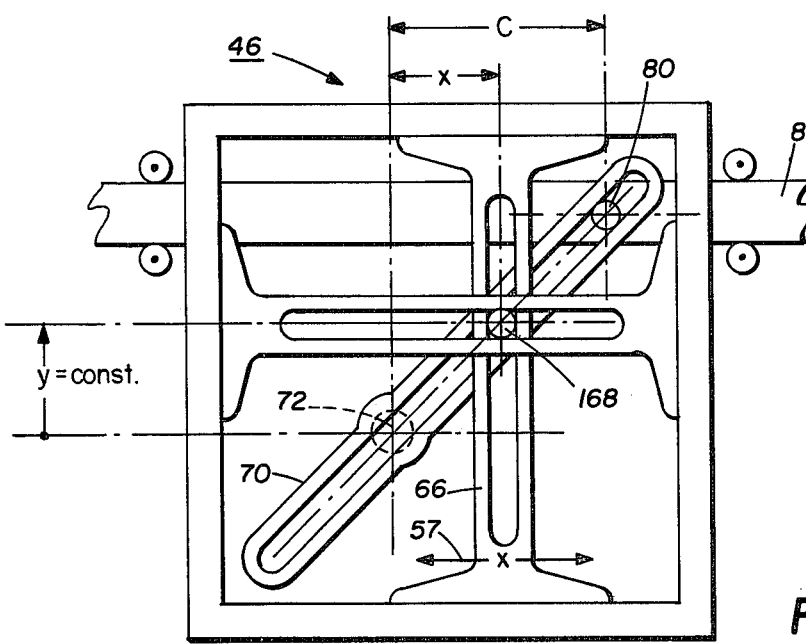

Comprising bridge 160 as best seen in FIG. 11 is a flat rectangular base 164 which secures directly to link 56 and includes an elongated slot 166 located therein. Pin 168 is laterally secured to underlying plate 170 for extending through slot 166. Securing plate 170 to the underside of base 164 is a screw 172 extending through open ended slot 174. Pin 168 is received in Watts linkage 68 as a replacement for pin 44 and to preset its constant input it can be adjustably located within the longitudinal extent of slot 166 by loosening screw 172 and displacing plate 170 relative to base 164.

Operation with the modification of FIGS. 10-13 is analogous to that previously described without the benefit of any temperature input. With pin 168 providing a constant input and pressure connection 48 providing a variable input as before, multiplier 46 similarly effects an integrated output through Watts link 68 for displacing link 82.

By the above description there is disclosed a novel self-contained unit adapted for integral operation with a gas meter to correct actual gas volume for both pressure and temperature in effecting a compensated register indicating an equivalent standard volume. Comparing both the compensated and uncompensated register enables the operator to readily determine the amount of gas line differential brought about by pressure and temperature variations in the gas stream. By virtue of the correction afforded thereby, the previous temperature and pressure malignment associated with gas meters of the prior art is substantially if not completely eliminated in a reliable and economical manner, particularly when compared with the economic injustices previously encountered. Appropriate selection of components renders certain of the components readily interchangeable and/or with adjustments, any desired equivalent standard temperature and pressure range can be readily accommodated. For example, such variations may include 50° F. to 75° F. and base pressure from 11 to 15 p.s.i.a. Whereas the invention has been specifically described in association with a gas meter, it should be readily apparent that its application and mechanism is adaptable to any fluid whether gas or liquid.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. Correction apparatus for a fluid meter to provide an equivalent standard volume readout of fluid being metered comprising in combination:
    (a) temperature sensing means adapted to be exposed to the metered fluid and operable to produce a first linear displacement motion correlated to change in temperature incurred by the fluid relative to the standard condition;
    (b) pressure sensing means adapted to be exposed to the metered fluid and operable to produce a second linear displacement motion in a direction substantially perpendicular to said first motion and correlated to changes in pressure incurred by the fluid relative to the standard condition;
    (c) multiplier means to separately receive each of said first and second displacement motions and to produce an integrated output displacement motion correlated to the multiplication product of said received input motions;
    (d) a corrected readout register;
    (e) drive means operative by the meter at a rate proportional to the actual fluid volume being metered; and
    (f) positionably resettable adjustment means operatively connecting said drive means to said register and resettable by the output of said multiplier means to incur changes in position setting in correlation to changes in the output displacement motion of said multiplier means, said changes in position setting occurring at reset intervals proportional to the operational rate of said drive means whereby to effect a variable ratio drive advance of said register relative to the drive rate of said drive means as an integrated function of temperature and pressure of the metered fluid sensed by said temperature and pressure sensing means.

2. Correction apparatus according to claim 1 in which said temperature sensing means produces said first motion displacement in correlation to changes in absolute temperature incurred by the metered fluid and said pressure sensing means produces said second motion displacement correlated to changes in absolute pressure incurred by the metered fluid.

3. Correction apparatus according to claim 1 comprising a unitized assembly mountable on a meter with which it is to be used for integral operation therewith.

4. Correction apparatus according to claim 3 in which said temperature sensing means includes temperature compensation means to compensate said first displacement motion for ambient temperature changes of said unitized assembly.

5. Correction apparatus according to claim 1 in which said adjustment means comprises a displaceable limit stop rotatably positioned by said multiplier means in angular correlation to the output thereof and said drive means input to said register has a regulated operational advance determined by the position of said limit stop.

6. Correction apparatus according to claim 5 in which said drive means includes an oscillating drive input to said register and said limit stop position effectively limits the travel stroke of said oscillating drive input.

7. Correction apparatus according to claim 6 in which said drive means includes a one way clutch actuated to advance said register in only one incurred oscillating direction of said oscillating drive input.

8. Correction apparatus according to claim 7 in which said oscillating drive input includes a driving arm mounted for rotation and operationally oscillated in a predetermined fixed stroke by a cranking motion of said drive means and a driven arm mounted for rotation and oscillated by said driving arm in a comparatively reduced stroke variably determined by the position of said limit stop.

9. Correction apparatus according to claim 8 in which said clutch is directly actuated by said driven arm for advancing said register.

10. Correction apparatus according to claim 7 including brake means effective to prevent position changes to said limit stop when said oscillating drive input incurs its other oscillating direction.

11. Correction apparatus for a fluid meter comprising in combination:
    (a) sensing means sensitive to one of fluid pressure or temperature conditions and adapted to be exposed to the metered fluid to produce a linear displacement motion correlated to a sensed condition change thereof in the fluid relative to a standard condition therefor;

(b) input means providing a constant position setting correlated to a predetermined value of fluid pressure or temperature conditions for the other of said one condition to which said sensing means is sensitive;

(c) multiplier means separately receiving both said sensing means displacement motion and the constant value of said input means to produce an integrated output displacement motion correlated to the multiplication product thereof;

(d) a corrected readout register;

(e) drive means operative by the meter at a rate proportional to the actual fluid volume being metered; and (f) positionably resettable adjustment means operatively connecting said drive means to said register and resettable by the output of said multiplier means to incur changes in position setting in correlation to changes in the output displacement motion of said multiplier means, said changes in position setting occurring at reset intervals proportional to the operational rate of said drive means whereby to effect a variable ratio drive advance of said register relative to the drive rate of said drive means as an integrated function of inputs provided to said multiplier means by said input means and said sensing means.

12. Correction apparatus according to claim 11 in which said input means is adjustably presettable for effecting a position setting correlated to a predetermined value of choice.

13. Correction apparatus according to claim 11 in which said sensing means includes a pressure sensing unit and said input means provides a position setting correlated to a predetermined value of temperature.

14. Correction apparatus according to claim 11 comprising a unitized assembly mountable on a meter with which it is to be used for integral operation therewith.

15. Correction apparatus according to claim 11 in which said adjustment means comprises a displaceable limit stop rotatably positioned by said multiplier means in angular correlation to the output thereof and said drive means input to said register has a regulated operational advance determined by the position of said limit stop.

16. Correction apparatus according to claim 15 in which said drive means includes an oscillating drive input to said register and said limit stop position effectively limits the travel stroke of said oscillating drive input.

17. Correction apparatus according to claim 16 in which said drive means includes a one way clutch actuated to advance said register in only one incurred oscillating direction of said oscillating drive input.

18. Correction apparatus according to claim 17 in which said oscillating drive input includes a driving arm mounted for rotation and operationally oscillated in a predetermined fixed stroke by a cranking motion of said drive means and a driven arm mounted for rotation and oscillated by said driving arm in a comparatively reduced stroke variably determined by the position of said limit stop.

19. Correction apparatus according to claim 18 in which said clutch is directly actuated by said driven arm for advancing said register.

20. Correction apparatus according to claim 17 including brake means effective to prevent position changes to said limit stop when said oscillating drive input incurs its other oscillating direction.

* * * * *